(12) United States Patent
McBride

(10) Patent No.: US 6,448,090 B1
(45) Date of Patent: Sep. 10, 2002

(54) FLUID DELIVERY SYSTEM FOR A MICROFLUIDIC DEVICE USING ALTERNATING PRESSURE WAVEFORMS

(75) Inventor: Sterling Eduard McBride, Lawrenceville, NJ (US)

(73) Assignee: Orchid BioSciences, Inc., Princeton, NJ (US)

(*) Notice: Subject to any disclaimer, the term of this patent is extended or adjusted under 35 U.S.C. 154(b) by 0 days.

(21) Appl. No.: 09/349,438

(22) Filed: Jul. 9, 1999

(51) Int. Cl.[7] .................................................. B01L 3/00
(52) U.S. Cl. ........................ 436/180; 422/99; 422/100; 435/286.5; 435/286.6; 137/209
(58) Field of Search .................. 137/209, 807, 137/826, 833; 422/99, 100; 435/286.5, 286.6; 436/180; 204/450, 453, 600, 604

(56) References Cited

U.S. PATENT DOCUMENTS

| | | |
|---|---|---|
| 5,126,022 A | 6/1992 | Soane |
| 5,240,578 A | 8/1993 | Tatsumi |
| 5,358,613 A | 10/1994 | Schneider et al. |
| 5,611,676 A | 3/1997 | Ooumi |
| 5,639,423 A | 6/1997 | Northrup |
| 5,645,702 A | 7/1997 | Witt |
| 5,653,859 A | 8/1997 | Parton |
| 5,667,657 A | 9/1997 | Recknor et al. |
| 5,750,015 A | 5/1998 | Soane |
| 5,836,750 A | 11/1998 | Cabuz |
| 5,872,010 A | 2/1999 | Karger et al. |
| 6,117,396 A | * 9/2000 | Demers ...................... 422/100 |

* cited by examiner

*Primary Examiner*—Jill Warden
*Assistant Examiner*—John S. Starsiak, Jr.
(74) *Attorney, Agent, or Firm*—Kevin G. Mierzwa

(57) ABSTRACT

A microfluidic fluid delivery system includes a microfluidic chip having a fluid input. A fluid reservoir is coupled to the fluid input. A gas delivery system has a gas pressure source and a variable amplitude function generator generating an alternating signal. A valve is coupled to the function generator and the gas pressure source. The valve controls the gas pressure pulse in response to said alternating signal. The gas pressure pulse displaces fluid from the fluid reservoir into the fluid input.

23 Claims, 3 Drawing Sheets

FLUID DELIVERY SYSTEM FOR A MICROFLUIDIC DEVICE USING ALTERNATING PRESSURE WAVEFORMS

RELATED APPLICATION

This application is related to U.S. patent application Ser. No. 09/351,206, now U.S Pat. No. 6,395,232 entitled "Fluid Delivery System for A Microfluidic Device Using A Pressure Pulse" filed simultaneously with the present application, the subject matter of such co-pending application being incorporated herein by reference.

TECHNICAL FIELD

The present invention relates to microfluidic devices, and more particularly, to a method and apparatus for distributing fluid on a microfluidic device.

BACKGROUND OF THE INVENTION

Methods of making a homologous series of compounds, or the testing of new potential drug compounds comprising a series of light compounds, has been a slow process because each member of a series or each potential drug must be made individually and tested individually. For example, a plurality of potential drug compounds is tested by an agent to test a plurality of materials that differ perhaps only by a single amino acid or nucleotide base, or a different sequence of amino acids or nucleotides.

The processes described above have been improved by microfluidic chips which are able to separate materials in a and move the materials through the microchannel is possible. Moving the materials through microchannels is possible by use of various electro-kinetic processes such as electrophoresis or electro-osmosis. Fluids may be propelled through various small channels by the electro-osmotic forces. An electro-osmotic force is built up in the channel via surface charge buildup by means of an external voltage that can repel fluid and cause flow.

Another method for the movement of fluids is the use of an electrohydrodynamic pump. In electro-osmotic and electrohydrodyamic pumping, electrodes are placed within the microfluidic structure.

In fluid delivery in microfluidic structures, it is important to distribute approximately the same fluid volume to each reaction well. In using certain fluids, however, even distribution within reaction wells is difficult to accomplish.

SUMMARY OF THE INVENTION

It is, therefore, one object of the invention to provide an improved fluid delivery mechanism to an array of reaction wells. It is a further object of the invention to provide a reliable method for delivering fluid to reaction wells.

It is another object of the present invention to create a relatively small device which can carry out hundreds and even thousands of chemical experiments simultaneously, create new compounds, and measure their reactivities.

It is yet another object of the present invention to provide a liquid handling drug discovery and diagnostic tool which increases the speed and productivity of discovering new drug candidates and does so on a miniaturized scale or platform that reduces cost and manual handling. It is still a further object of the present invention to provide a multiple fluid sample processor, system and method which is capable of conveying, transporting, and/or processing samples in a large multiplicity of sites without exposure to the atmosphere.

In one aspect of the invention, a microfluidic fluid delivery system includes a microfluidic chip having a fluid input. A fluid reservoir is coupled to the fluid input. A gas delivery system has a gas pressure source and a variable amplitude function generator generating an alternating signal. A valve is coupled to the function generator and the gas pressure source. The valve controls the gas pressure in response to said alternating signal. The gas pressure displaces fluid from the fluid reservoir into the fluid input.

In a further aspect of the invention, a method of distributing fluid to a microfluidic chip comprises the steps of: providing a reservoir having fluid therein; generating an alternating pressure to cyclically pressurize fluid within a microfluidic device; filling capillary channels in the microfluidic device until each channel is filled to a capillary break; increasing the amplitude of the alternating pressure; and thereby, overcoming the capillary break in response to the increase in the amplitude.

One advantage of the invention is that small and controlled amounts of fluid may be delivered in an array structure with microchannels that have high pressure losses. Another advantage of the invention is that the method for delivering fluid to microfluidic structures is applicable to structures having high integration densities and where viscous losses in microchannels are significant.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
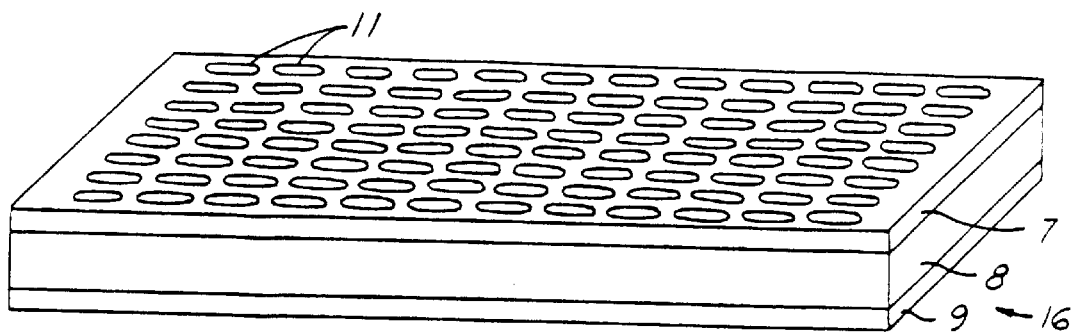
FIG. 1 illustrates a multiple fluid sample processor according to the present invention.

Referring now to the drawings, like reference numerals are used to identify identical components in the various views. The present invention can be used particularly in the industrialization of drug discovery processes. The present invention increases speed and productivity while providing researchers with expended capabilities and assuring quality. The invention provides substantial time and efficiency advantages over prior techniques. The invention provides miniaturized liquid handling systems which perform the biological, chemical and the analytical processes fundamental to life sciences, research and development. The invention can be utilized to perform thousands of reactions simultaneously in an integrated format, which substantially reduces the time, effort and expense required while improving the quality of the test results.

The processor in accordance with the present invention generally incorporates a modular configuration with distinct layers or plates. The processor or microfluidic device 16 is capable of conducting parallel synthesis of thousands of small molecule compounds through the precise delivery of reagents to discrete reaction sites. This helps create a significantly larger number and variety of small molecules more effectively and with fewer resources.

With the present invention, arrays of DNA can be synthesized on demands. The processor can also be used for high volume of sample processing and testing, as well as the search for new molecular targets and determining expression levels and response to known drugs. The processor can incorporate multiple assay formats, such as receptor binding, antibody-antigen interactions, DNA/RNA amplification and detection, as well as magnetic deed base separations. The versatility of the processor and its architecture make it available for use with synthesize work stations, genomic support stations, and analytical preparation systems.

Figure 2:
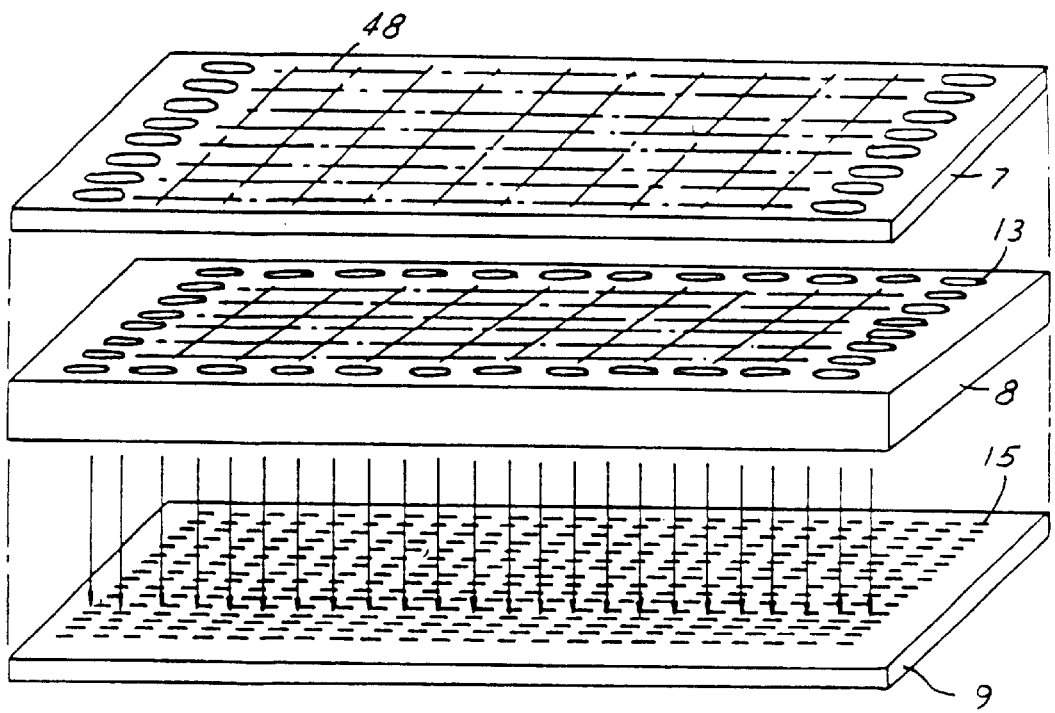
FIG. 2 is an exploded view of the processor shown in FIG. 1.

A basic multiple fluid sample processor or microfluidic device 16 in accordance with the present invention is shown in FIGS. 1 and 2, with cross-sections of the layers being shown in FIGS. 5, 6, 7 and 8. The microfluidic device is illustrated as a three-layered structure in the embodiment illustrated. The microfluidic device 16 is also called a fluid assay layered device (FALD), or a fluidic array.

The microfluidic device 16 includes a top layer 7, which is also called a reagent reservoir. The microfluidic device 16 also includes a middle layer or fluidic delivery layer 8, as well as a bottom layer or well plate 9.

The top layer 7 is also called a feed-through plate and serves as a cover for the microfluidic device 16. Layer 7 contains a number of apertures 11 which are selectively positioned immediately above apertures 13 in layer 8. Apertures 13 are connected by an elongated micro-channel 48 which in turn have a plurality of branches extending therefrom. As illustrated, layer 8 contains one layer, however, one skilled in the art would recognize that layer 8 may comprise several layers.

Well plate 9 has a plurality of wells 15 which are used to hold the reagents and other materials in order for them to react and synthesize.

The three layers 7, 8 and 9 are stacked together to form a modular configuration. They are also coupled together tightly to form a liquid-tight seal. If desired, the top layer 7 can be bounded or fused to the center distribution plate 8 or layer. The bottom or well plate layer 9, however, is detachably coupled to layer 8.

The plates 7, 8 and 9 may be made from any desirable material, such as glass, fused silica, quartz, or silicon wafer material. The reservoirs, micro-channels and reaction cells are controllably etched or otherwise formed onto the plates using traditional semi-conductor fabrication techniques with a suitable chemical etchant, laser drilling or reactive ion etching.

Top plate 7 contains apertures positioned above the openings 13 located in the central plate. These apertures provide the necessary openings for loading module to fill the reservoirs with a plurality of agents or other materials.

As will be further described below, a pressure pumping mechanism, is preferably used to assist in loading and distributing the reagents and other materials within the layers.

A typical need is for one of the sample plates to have each sample repeated conveyed, transported and/or processed while eventually being delivered into the well plate. During this time, the samples are typically exposed to the atmosphere and can oxidize, evaporate or cross-contaminate to an undesirable extent. With the present invention, however, the multi-layered sample microfluidic device 16 with detachable well plates inhibits cross-contamination of the fluids used in the combinatorial process.

The detachable layers in accordance with the present invention are preferably of a common dimensionality for ease of being handled by robotic or other automation means. A common set of dimensions has been adopted by many manufacturers which match that of the 96-well plate known as a "micro titer" plate.

Preferably, the plates 7, 8 and 9 are connected to each other by an indexing means of detents, flanges or locating pins so they are closely aligned in the horizontal and vertical directions. While engaged in such manner, samples from one of the plates can be caused to be moved and transported to another plate. Means for transporting or moving the samples from one of the plates to the other can be by pumping, draining, or capillary action. While the samples are engaged, and as a result of the transport of the samples from one layer to the other, the samples may be processed, reacted, separated, or otherwise modified by chemical or physical means, and then finalized by optical, electrochemical, chemical, or other means.

Samples or fluids can be delivered to the microfluidic device 16 by being contained in one of the members of physically engaging sample multi-well plates, such as a top layer 7, or other means of sample introduction can be utilized, such as through the edges of such layer.

Figure 3:
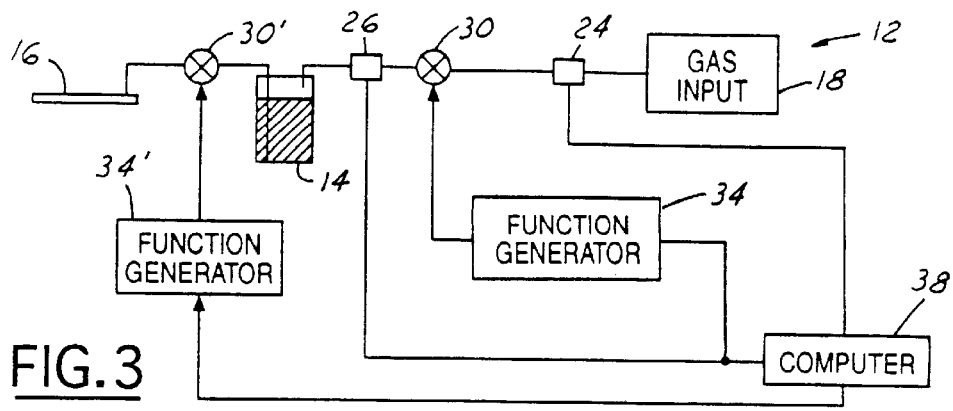
FIG. 3 is a block diagram schematic view of a microfluidic fluid delivery system according to the present invention.

Referring now to FIG. 3, a microfluidic fluid distribution system 10 is shown having a gas distribution system 12 coupled to a fluid reservoir 14. Fluid reservoir 14 is fluidically coupled to a microfluidic device 16. In general, gas distribution 12 is used to displace fluid from fluid reservoir 14 into microfluidic device 16.

Gas distribution system 12 has a gas input 18. The type of gas in gas input should be of the type not to react with reagents in the microfluidic device 16. For example, for many applications, nitrogen may be a suitable gas. Gas input 18 provides a high pressure source of gas to gas distribution 12. The pressure of gas input 18 is preferably at least the highest pressure desired in gas distribution system 12.

Gas distribution system 12 has a pressure regulator 24 and a pressure sensor 26. Pressure regulator 24 is preferably a programmable pressure regulator so that a desired constant pressure may be generated.

Gas distribution system 12 also has a valve 30. Valve 30 may, for example, be a solenoid valve. Valve 30 is coupled to a function generator 34 which generates an alternating electrical signal to control the valve 30 which in turn controls the pressure to fluid reservoir 14.

A second valve 30' connected to a second function generator 34' may also be used. Second valve 30' is coupled between chip 16 and fluid reservoir 14. Second valve 30' may be used in place of valve 30'.

A computer controller 38 that controls the operation and distribution of gas from gas input 18 to fluid reservoir 14 through valve 30. Computer controller 38 has a user input (not shown) for providing the control. That is, the various pressures desired at pressure regulator 24, and the desired timing of pulse generator 34 may be controlled by computer controller 38. Computer controller 38 uses feedback from pressure sensor 26 to control the operation of gas distribution system 12. Computer controller 38 is also coupled to function generator 34.

Figure 4:
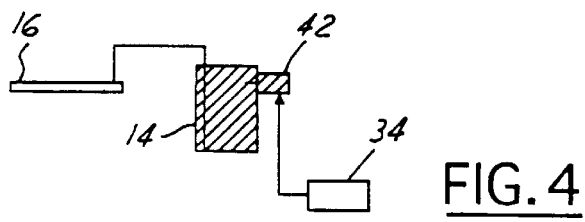
FIG. 4 is a partial schematic view of an alternative embodiment of the fluid reservoir of FIG. 3 in a full state.

Computer controller 38 is also coupled to second function generator 34'. When using two valves 30 and 30', the valve 30 may be opened to pressurize the reservoir 14 while valve 30' may be used to control the flow of fluid to chip 16, Referring now to FIG. 4, a piezoelectric transducer device 42 may be used in place of valve 30 so that the piezoelectric transducer applies the alternating pressure to fluid reservoir 14.

Figure 5:
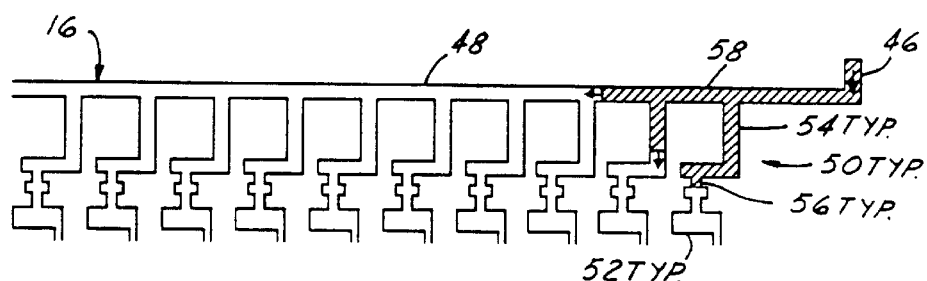
FIG. 5 is a cutaway view of microfluidic capillaries being filled according to the present invention.

Referring now to FIG. 5, the operation of the microfluidic distribution system 10 is best described with respect to microfluidic device 16. Microfluidic device 16 has an input 46 that is coupled to fluid reservoir 14. Input 46 is coupled to a main channel 48. Main channel 48 has various branches 50 that fluidically couple main channel 48 to reaction well 52. As is shown, ten reaction wells 52 are illustrated. However, various numbers of reaction wells 52 may be employed. The number of reaction wells 52 could approach 10,000 all of which may be coupled to a single fluid delivery system. The wells may also be grouped together and be serviced by several fluid delivery systems. Branches 50 have a cell feed 54 and a capillary stop 56. As shown, fluid 58 has entered through input 46 and has filled the first branches 50 up to capillary break 56. The flow of fluid 58 is initiated through computer controller 38. The pressure supplied is insufficient to break the capillary stop 56.

Figure 6:
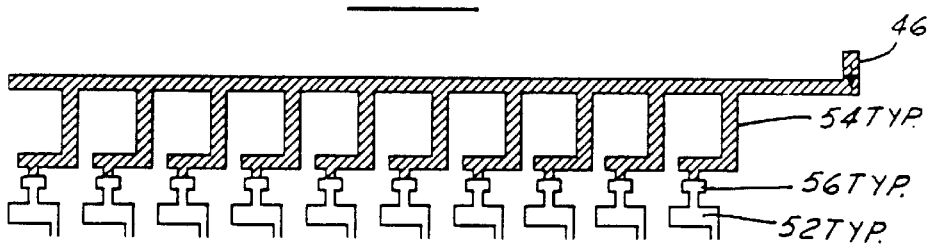
FIG. 6 is a cutaway view such as that shown in FIG. 5 having capillaries filled to an initial state.

Referring now to FIG. 6, each branch 50 is shown filled up to capillary stop 56. Branches 50 are filled sequentially from the closest to fluid input 46 to the most distant from fluid input 46.

Figure 7:
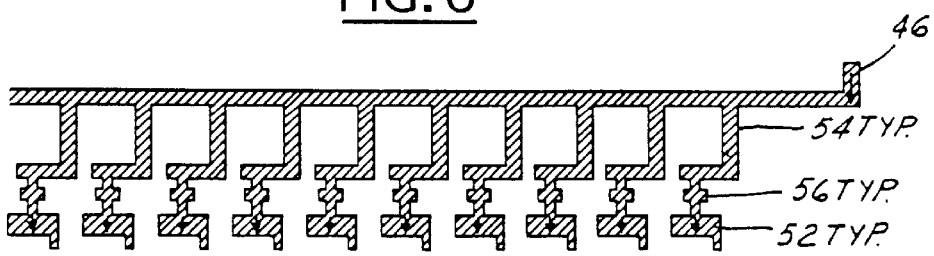
FIG. 7 is a cutaway view such as that shown in FIG. 5 with a reaction well in a full state.

Referring now to FIG. 7, fluid has now entered reaction well 52. The gas waveforms displace a fluid from fluid reservoir 14 into microfluidic device 16 through input 46. The pressure Is large enough to overcome the capillary stop 56 in each of branches 50.

Figure 8:
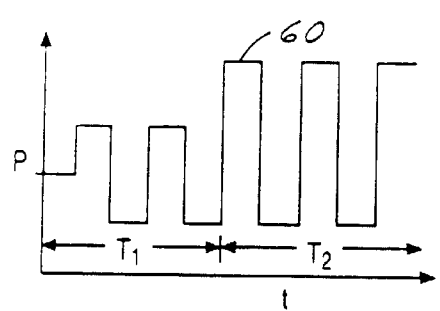
FIGS. 8 and 8a are a pressure versus time plots of a pressure waveforms formed according to the present invention.

Referring now to FIG. 8, a suitable high alternating pressure signal is illustrated. In one constructed embodiment, a signal 60 has a first amplitude during time $T_1$ and a second amplitude during time $T_2$. The increase in amplitude allows the capillary break to be overcome. Of course, other means for increasing the mean signal may be used such as increasing the frequency during time $T_2$.

Figure 8A:
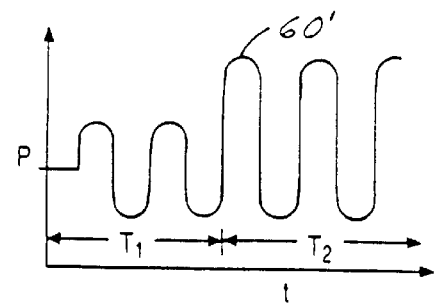

Referring now to FIG. 8a, a function generator may be used to generate pressure waveforms that range from square waves to sinusoidal waves. Signal 60' approaches a sinusoidal wave having two different amplitude portions. The lower amplitude portion is used for filling the capillaries of the chip up to the capillary break. The higher amplitude portion is used for breaking the capillary break.

The second higher amplitude regions of the signals 60, 60' may be continued to not only fill the wells on the chips, but may also be used to dispense fluid from the chips. The waveforms may be controlled to provide full or partial well filling.

Figure 9:
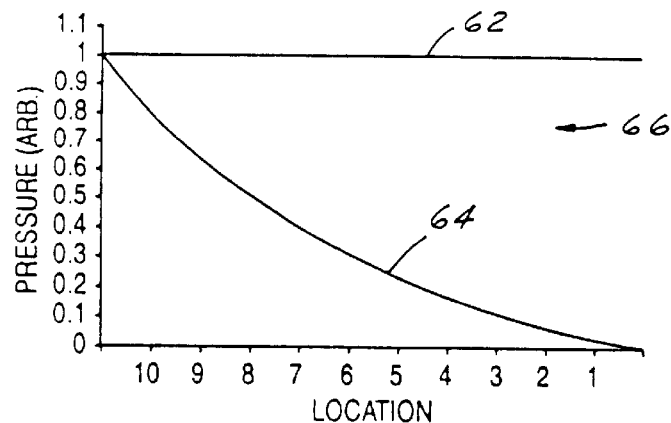
FIG. 9 is a plot of an upper limit pressure drop and a lower limit pressure drop along a micro channel.

Referring now to FIG. 9, a plot showing upper limit pressure drop along main channel 48 for stagnant fluid flow is shown by line 62. As will be evident to those skilled in the art, the pressure along main channel 48 decreases as the distance from fluid input 46 increases due to the pressure drop along 48. Line 64 represents the pressure drop along main channel 48. The locations 1 through 10 correspond to the branches 50. Line 64 corresponds to the lower limit pressure drop along main channel 48 for a fully developed fluid flow. Area 66 between line 62 and line 64 corresponds to a transient region of the operation of a microfluidic device 16. As the distance from fluid input 46 increases, the lower limit line 64 approaches to zero.

Figure 10:
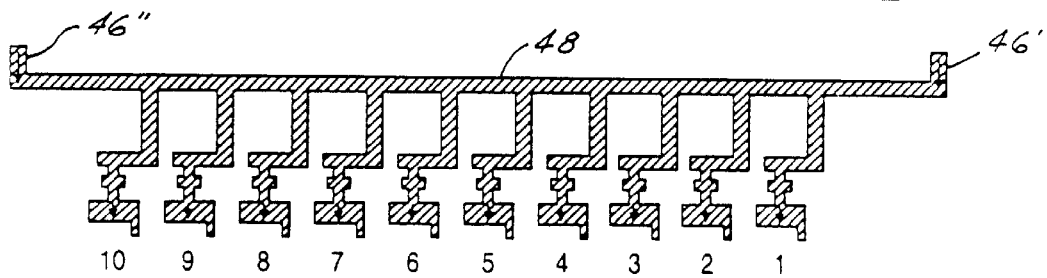
FIG. 10 is a two-sided pressure head system operated in a similar manner to that described with respect to FIG. 3.

Referring now to FIG. 10, to overcome the decrease in pressure due to the distance from the input, a first input 46' and a second input 46" may be coupled to main channel 48 at opposite ends.

Figure 11:
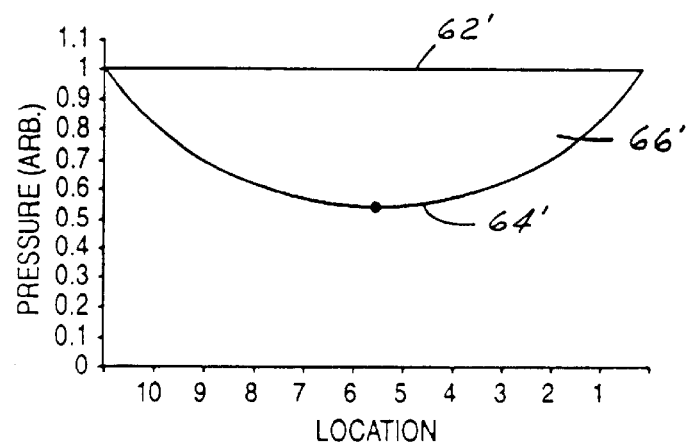
FIG. 11 is a plot of pressure versus location showing upper limit pressure drop and lower limit pressure drop along the microfluidic structure of FIG. 10.

Referring now to FIG. 11, transient area 66' has been reduced significantly by adding a second fluid input 46". The lower limit pressure drop denoted by line 64' is thus may be reduced to about 50 percent of the upper limit line 62' compared to almost zero with a single input as illustrated in FIG. 9.

While particular embodiments of the invention have been shown and described, numerous variations and alternate embodiments will occur to those skilled in the art. Accordingly, it is intended that the invention be limited only in terms of the appended claims.

What is claimed is:
1. A microfluidic fluid delivery system comprising:
   a microfluidic device having a fluid input;
   a fluid reservoir coupled to the fluid input;
   a variable amplitude function generator generating an alternating signal; and
   a gas distribution system coupled to said function generator and said fluid reservoir, said gas distribution system controlling an alternating gas pressure in response to said alternating signal, said gas distribution system displacing fluid from said fluid reservoir into said fluid input.
2. A microfluidic fluid delivery system as recited in claim 1 wherein said gas distribution system comprises a gas input.
3. A microfluidic fluid delivery system as recited in claim 1 wherein said gas distribution system comprises a transducer.
4. A microfluidic fluid delivery system as recited in claim 3 wherein said transducer comprises a piezoelectric transducer.
5. A microfluidic fluid delivery system as recited in claim 1 wherein said function generator generates a square wave.
6. A microfluidic fluid delivery system as recited in claim 5 wherein said square wave has a frequency in the kilohetz range.
7. A microfluidic fluid delivery system as recited in claim 2 further comprising a first pressure regulator coupled to said gas input.
8. A microfluidic fluid delivery system as recited in claim 7 wherein said first pressure regulator comprises a programmable pressure regulator.
9. A microfluidic fluid delivery system as recited in claim 1 wherein said gas distribution system comprises a solenoid valve.
10. A microfluidic fluid delivery system as recited in claim 1 wherein said microfluidic device comprises a first fluid input fluidically coupled to said fluid reservoir, said fluid input coupled to a main channel, said main channel having a plurality of branches extending therefrom.
11. A microfluidic fluid delivery system as recited in claim 10 wherein said main channel has a first end and a second end, said plurality of branches disposed between said first end and said second end.

12. A microfluidic fluid delivery system as recited in claim 1 wherein said microfluidic device has a channel feed fluidically coupled to said fluid input, a capillary stop fluidically coupled to the channel feed and a reaction well disposed adjacent to the capillary break.

13. A microfluidic fluid delivery system as recited in claim 1 wherein said microfluidic device comprises a second fluid input coupled to said reservoir.

14. A microfluidic system comprising:
   microfluidic chip having a first fluid input fluidically coupled to a plurality of wells;
   a gas input;
   a gag distribution system coupled to said gas input;
   a function generator generating an alternating electrical signal;
   a fluid reservoir coupled to said first fluid input;
   a first valve coupled to said function generator, said gas input and said fluid reservoir; and
   a controller coupled to said valve and said controller controlling filling of said wells with fluid.

15. A microfluidic fluid delivery system as recited in claim 14 wherein said gas distribution system comprises a first pressure regulator coupled to said gas input.

16. A microfluidic fluid delivery system as recited in claim 15 wherein said gas distribution system comprises a first pressure sensor electrically coupled to said controller and fluidically coupled between a first regulator and a second valve.

17. A microfluidic fluid delivery system as recited in claim 14 wherein said first valve comprises a solenoid valve.

18. A microfluidic fluid delivery system as recited in claim 14 wherein said microfluidic chip comprises a second fluid input coupled to said reservoir.

19. A method of distributing fluid to a microfluidic device comprising the steps of:
   providing a reservoir having fluid therein;
   generating an alternating pressure to cyclically pressurize fluid in the reservoir with alternating pressure up to a first amplitude;
   filling capillary channels of the microfluidic device from the reservoir until each channel is filled to a capillary break of the microfluidic device;
   increasing the first amplitude of the alternating pressure to a second amplitude; and thereby,
      overcoming the capillary break in response to the second amplitude.

20. A method as recited in claim 19 further comprising the steps of filling a well of the microfluidic device in response to the step of overcoming.

21. A method as recited in claim 19 wherein said step of generating an alternating pressure comprises the steps of generating an electrical step signal; and, activating a solenoid valve in response to said electrical step signal.

22. A method as recited in claim 19 wherein the step of filling comprises filling the capillary channels from the reservoir in the microfluidic device until each channel is filled to a capillary break and an equilibrium is reached.

23. A method as recited in claim 19 further comprising the step of filling a well.

* * * * *